United States Patent [19]

Langos et al.

[11] Patent Number: 5,256,051
[45] Date of Patent: Oct. 26, 1993

[54] STORAGE HEAD FOR A BLOW MOLDING MACHINE

[75] Inventors: Peter Langos, St. Augustin; Manfred Lehmann, Cologne, both of Fed. Rep. of Germany

[73] Assignee: Mauser-Werke GmbH, Bruehl, Fed. Rep. of Germany

[21] Appl. No.: 828,981

[22] PCT Filed: May 28, 1991

[86] PCT No.: PCT/EP91/00984
§ 371 Date: Mar. 30, 1992
§ 102(e) Date: Mar. 30, 1992

[87] PCT Pub. No.: WO91/18731
PCT Pub. Date: Dec. 12, 1991

[30] Foreign Application Priority Data

Jun. 1, 1990 [DE] Fed. Rep. of Germany ....... 4017699

[51] Int. Cl.⁵ ............................................. B29C 47/06
[52] U.S. Cl. .................................. 425/133.1; 425/381; 425/467; 425/523; 425/532
[58] Field of Search ................. 425/532, 131.1, 133.1, 425/467, 523, 381

[56] References Cited

U.S. PATENT DOCUMENTS

| | | | |
|---|---|---|---|
| 3,966,377 | 6/1976 | Upmeier et al. | 425/133.1 X |
| 3,985,490 | 10/1976 | Kader | 425/381 |
| 4,063,865 | 12/1977 | Becker | 425/467 |
| 4,120,633 | 10/1978 | Feuerherm | 425/462 |
| 4,182,603 | 1/1980 | Knittel | 425/133.1 |
| 4,201,532 | 5/1980 | Cole | 425/467 X |
| 4,305,902 | 12/1981 | Uhlig | 425/532 X |
| 4,422,838 | 12/1983 | Iwawaki et al. | 425/532 X |
| 4,424,178 | 1/1984 | Daubenbüchel et al. | 425/381 X |
| 4,548,569 | 10/1985 | Pitigliano et al. | 425/133.1 |
| 4,609,340 | 9/1986 | Irwin et al. | 425/532 |
| 4,731,216 | 3/1988 | Topolski | 425/523 X |
| 4,802,833 | 2/1989 | Shapler | 425/131.1 |
| 5,004,578 | 4/1991 | Eiselen | 425/532 X |
| 5,116,215 | 5/1992 | Hsu | 425/381 |

FOREIGN PATENT DOCUMENTS

| | | |
|---|---|---|
| 0279321 | 2/1988 | European Pat. Off. . |
| 0349872 | 1/1990 | European Pat. Off. . |
| 0380015 | 8/1990 | European Pat. Off. . |
| 1964675 | 12/1969 | Fed. Rep. of Germany . |
| 2046334 | 3/1972 | Fed. Rep. of Germany . |
| 2239987 | 2/1974 | Fed. Rep. of Germany . |
| 2617898 | 11/1977 | Fed. Rep. of Germany . |
| 2712910 | 9/1978 | Fed. Rep. of Germany ... 425/133.1 |
| 3000444A1 | 7/1981 | Fed. Rep. of Germany . |
| 3623308A1 | 1/1988 | Fed. Rep. of Germany . |
| 2354188 | 1/1978 | France . |
| 54-31465 | 3/1979 | Japan ............... 425/131.1 |
| 59-85720 | 5/1984 | Japan . |

OTHER PUBLICATIONS

Hensen, F., et al., *Handbuch der Kunststoff-Extrusionstechnik II Extrusionsanlagen*, 1986, Carl Hansen Verlag München Wien, Germany, p. 406.

*Primary Examiner*—Richard L. Chiesa
*Attorney, Agent, or Firm*—Pennie & Edmonds

[57] ABSTRACT

The invention relates to a storage head for a blow moulding machine for discontinuous manufacture of multi-layer co-extruded and blow-moulded hollow bodies made of thermoplastic. To improve the product quality and to increase the throughput, each distributor element is designed as a spiral channel distributor (20) which distributes the individual molten plastic streams uniformly at the periphery. The ejector (14) consists of at least two concentric tubular pieces (42, 44, 46) and the peripherally distributed plastic streams issue from the front face of the ejector (14) and unite to form a single multi-layer flexible plastic tube in the storage space (16) in the storage head housing (10) below the ejector.

11 Claims, 6 Drawing Sheets

STORAGE HEAD FOR A BLOW MOLDING MACHINE

BACKGROUND OF THE INVENTION

The invention relates to a storage head for a blow molding machine for the discontinuous production of multiple-layer high-volume plastic hollow bodies, comprising: at least two extruders connected to the storage-head housing to feed at least two liquid plastic melts into the storage head; a centrally disposed shaft; and at least two mutually independent distributor elements, concentrically surrounding the shaft to distribute the plastic melts circumferentially and to conduct them into an annular storage space below the ejector piston, which is mounted in the storage-head housing by means of a setbolt so as to be movable axially, and by means of which the multiple-layer plastic melt which is distributed circumferentially and which is stored in the storage space is ejected or co-extruded through an annular nozzle gap which is connected below to the storage space.

A comparable storage head of this type is known, e.g , from the DE-OS 39 02 270. This storage head is used for the discontinuous production of multiple-layer, co-extruded, hose-like parisons of thermoplastic to form high-volume, multiple-layer hollow bodies in a divided blow mold. With this storage head, at least two different annular material melts are brought together centrally within the ring piston, one after the other, in the extrusion direction, to form a multiple-layer material melt. After this, the multiple-layer material melt expands in funnel-like fashion and flows into an annular storage space. Subsequently, it is ejected from the storage head housing, by a ring piston that is movable in the axial direction, through an annular nozzle gap. The streams of plastic melt are conducted individually for each layer - up to five different layers may be present. Each one is distributed over the circumference by a separate ring channel. From there, they flow through a annular gap into the storage space beneath the ejector piston. With this circumferential distribution through a ring channel, a disadvantageous feature is the fact that on the side which is opposite to the infeed point, where the two semicircular partial streams coalesce, a welding seam always results, which later appears in the blown hollow body as a longitudinal seam and thus as a weak point. In the case of co-extruded, multiple-layer hollow bodies, the inner welding seams are indeed always covered up by the outer layer; nevertheless, they remain recognizable in the finished product by the formation of undesirable striations.

For example, ring channels or heart-shaped distributors are known as distributor elements to distribute the solid melt strand of plastic, which is conducted from the extruder into the storage housing, onto a circular circumference. However, various plastic molecules or particles here must traverse flow paths of different length. The coalescence points of the individual plastic streams may be recognizable in the blow-molded article as corresponding coalescence-based longitudinal seams. This reduces product quality.

SUMMARY OF THE INVENTION

It is an object of the invention to specify a novel storage head for a blow molding machine for the discontinuous production of plastic hollow bodies, especially high-volume ones, which has rheologically the same flow conditions for all the plastic particles when the liquid melted plastic stream is conducted to a distributor element, and in the distributor elements themselves, and which makes possible improved overlap and circumferential distribution of the melt streams in the distributor element while simultaneously increasing the throughput power and production speed of the blow molding machine.

According to the invention, this object is achieved as follows: The ejector piston consists of at least two tubular pieces which surround one another concentrically, and a separate distributor element is associated with each tubular piece, each distributor element being designed as a cylinder-shaped spiral-channel distributor.

With the inventive design, the plastic melts are fed in from the extruders by means of a spider shaft designed as a multiple-channel system. Here, the individual plastic melts are each divided from an axial central stream (main stream) to several radial borings (partial streams) which lead in star-shaped fashion to the outside. The central separate infeed and the melt distributors (spiral channels) which follow so as to be connected symmetrically with respect to the flow direction guarantee a completely symmetric circumferential distribution of the melted plastic streams as far as the storage space of the storage head, where the individual plastic layers, distributed along the circumference, combine to form a single, multiple-layer plastic hose. Here, each plastic particle at each location in the circumference of the co-extruded article has one and the same rheological flow history, independent of the throughput power of the extruder or of the storage head. The consequence of this fact is that the all-around distribution is completely symmetric.

In a configuration of the invention, the arrangement is such that the axial length of each distributor element or of the individual spiral channels in the longitudinal direction is about the same as its respective circular diameter. Here, at least two or more spiral channels are provided, uniformly distributed along the circumference of the distributor element. The separate streams of plastic melt at first are each conducted centrally through an axial boring, as the main stream within the shaft. The individual spiral channels are each then connected as partial streams to the central boring, through radially extending borings which are arranged in star-shaped fashion. The spiral channels are thus supplied with plastic melt. The spiral-channel distributor can be compared to a multiple-start thread or spiral channel with a particular pitch, affixed on an outside wall (e.g. of the shaft, of the ejector piston, or of an additional sheath), or on an inside wall (e.g. of the ejector piston, of an additional sheath, or of a cylindrically shaped, tubular piece, or of the inside wall of the storage head). The spiral channels are fed individually, and their depth decreases steadily in the flow direction. In this way, the plastic streams existing in the spirals are gradually brought over into axial streams. The axial streams form in the enlarging annular gap between the spiral-channel distributor and the sheath which covers it. The axially outflowing streams of melt from the individual spiral channels always overlap the axial circumferential streams which flow underneath, as well as the residual streams of melt which flow in the spiral channels. They do this as a sickle-shaped circumferential surface. The individual spiral channels are fed, as already mentioned, through a central boring in the shaft. Depending on the number of spiral channels, this is divided in star-shaped fashion outwardly among the individual spirals.

An essential feature of the invention is that the distributor elements are designed as cylindrically shaped spiral-channel distributors (annular gaps). The combination of the spiral-channel distributors with the respectively central infeed of the individual streams of plastic melt offers quite decisive advantages:

The central infeed achieves a rheologically uniform flow history for all the plastic particles. The spiral-channel distributor achieves far-reaching overlap of the streams of melt with respectively only one melt distributor.

The inventive storage head with a spiral-channel distributor increases the throughput power as compared to conventional storage heads with, e.g., a ring-channel distributors or heart-shaped distributors. For example, in the case of a 20 l head storage, the throughput power is increased from 650 kg/h to about 800 kg/h. Furthermore, it improves the all-around distribution of the plastic material.

There are natural limits to the increase of throughput power in the case of known melt distributors, in which the ejector piston of the storage head distributes the plastic material through heart-shaped elements. When these limits are exceeded, product quality is reduced, for example, by partial thin points or longitudinal seams in the article.

In the case of the inventive co-extrusion storage head, the ejector piston consists of several cylindrical sheaths or tubular pieces. Here, each tubular piece receives a spiral-channel distributor on its outside surface, and the inside surface of the tubular piece serves simultaneously as a fixed covering for the next interior spiral-channel distributor. The outermost spiral-channel distributor is suitably covered with a thin sheet metal sheath, fastened at the ejector piston, to prevent shear forces from acting on the plastic melt, as a result of adhesion to the relatively vulnerable inside walls of the housing.

In an embodiment as a triple-layer co-extrusion storage head, three separate extruders feed in their plastic melt at a different height through the respectively centrally situated infeed borings in the shaft for the individual spiral-channel distributors. Different plastics can here be combined even without a bonding agent.

Thus, the inside layer of a triple-layer parison can consist of a high-grade food-compatible new plastic material such as, e.g., HDPE—or, for filling with hazardous liquids, it can have diffusion blocking additives, e.g. Celar platelets)—, while the thicker middle layer, as a support layer, is formed of reprocessed recycling regranulate, and the third outermost layer, as the dye-bearing layer, again consists of new material charged with pigments.

When only two extruders are used for a triple-layer parison, the middle layer suitably again consists of filler regranulate, while the inner and outer layers are supplied with plastic melt from only one extruder and consist of new material.

The inventive spiral-channel distributor achieves the following advantages:
extensive area overlap of the individual melt streams with only one melt distributor element,
overlap length possible beyond half the circumference (180°) up to about 240° (important for welding the individual streams); in the design with, e.g., six spirals and 240° overlap length, this leads to quadruple overlap in a single layer
the same rheological flow properties hold for all the individual streams,
since each spiral channel is fed individually (partial stream), a faster and better circumferential distribution and thus a considerable increase of throughput power can be achieved by means of a storage head that is equipped with spiral channels.

DESCRIPTION OF THE PREFERRED EMBODIMENTS

Figure 1:
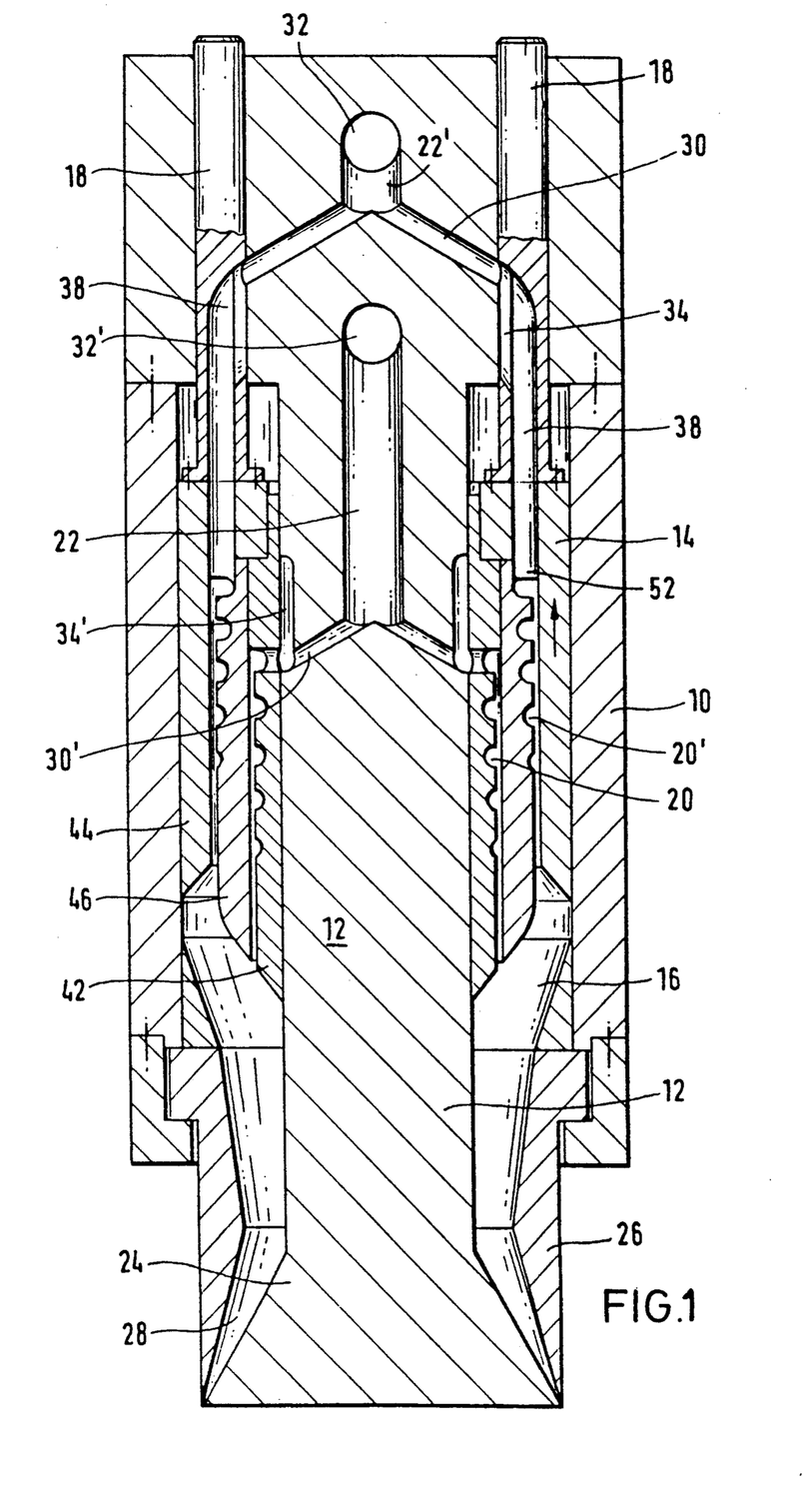
FIG. 1 shows an inventive storage head to produce a two-layer, co-extruded hollow body.

In FIG. 1, the housing of a storage head (accumulator head) for a blow molding machine is designated by the reference number 10. A cylindrically shaped shaft 12 is disposed centrally in the storage head housing 10. An ejector piston 14 is movably mounted on the shaft 12 by means of an hydraulically activated setbolt 18. On the outside, the ejector piston 14 abuts flush-tight to the inside wall of the storage head housing 10. Below the ejector piston 14 (ring piston), between the shaft 12 and the housing 10, a storage space 16 is formed for the intermediate storage of the plastic melt that is distributed circumferentially. The multiple-layer plastic melt, which collects in the storage space 16, slowly but steadily raises the ejector piston 14 into its upper ejection position. When the storage space 16 is filled, the plastic melt that is in intermediate storage is ejected or co-extruded as a hose-shaped parison into an opened blow mold that is disposed underneath, by the downwardly moving ejector piston 14, through a annular-gap nozzle 28 that is formed between the central nozzle core 24 and the outer nozzle ring part 26. In the representation of FIG. 1, the ejector piston 14 is just situated at its lowermost position (ejection position).

According to the invention, the ejector piston 14 consists of three tubular pieces 42, 44 and 46, which surround one another concentrically, and which are all rigidly connected together. At the surface of the inner tubular piece 42 and the middle tubular piece 46, distributor elements are formed, with at least four circumferentially distributed spiral channels. The outermost tubular piece 44 here serves only as a cover sheath for the outermost spiral-channel distributor.

Each of two liquid plastic melts is fed through the radial feedline (boring) 32, 32' from the two extruders, so as to pass centrally into the shaft 12. There, the melt streams are deflected into an axial boring 22, 22'. The length of the respective central borings 22, 22' in the shaft 12 are at least as long, but preferably about three times as long, as the diameter of the boring 22, 22' itself.

From the central borings 22, 22', the main melt streams are divided into individual partial streams, through a plurality of radial borings 30, 30' which run in star-like fashion. These partial streams are conducted to an individual spiral groove of the respective spiral-channel distributor. The transition of the respective partial streams of plastic melt from the fixed shaft 12, through the radial borings 30, 30' to the movable ejector piston 14 is, in each case, made through a longitudinal groove 34, 34' so as to bridge over the stroke motion.

According to a feature of the invention, at least one of the setbolts 18—which connect to the ejector piston 14 and which are provided for the axial motion of the ejector piston 14—are designed hollow and are provided with an axial boring 38. This setbolt is used as an infeed line to feed the plastic melt into a distributor element.

In the present case, only three out of the six setbolts is designed hollow. One partial stream from a radial boring 30 is conducted through a longitudinal groove 34 in the hollow setbolt 18 into a feed line 52 in the ejector piston 14.

Each feed line 52 is forked once again in the circumferential direction (divided into two partial streams). It supplies the two adjoining spiral channels with plastic melt, so that here six individual spiral channels of the outer spiral-channel distributor 20' can be fed through three hollow setbolts 18.

The inner spiral-channel distributor 20 is supplied with plastic melt through longitudinal channels 34' which are disposed directly in the outer wall of the shaft. The individual, circumferentially distributed plastic streams exit frontally from the ejector piston or from the individual distributor elements, as thin hose-like layers. They combine in the storage space 16 to form a multiple-layer, tubular plastic strand, which is ejected or co-extruded discontinuously from the annular gap nozzle 28.

Figure 2:
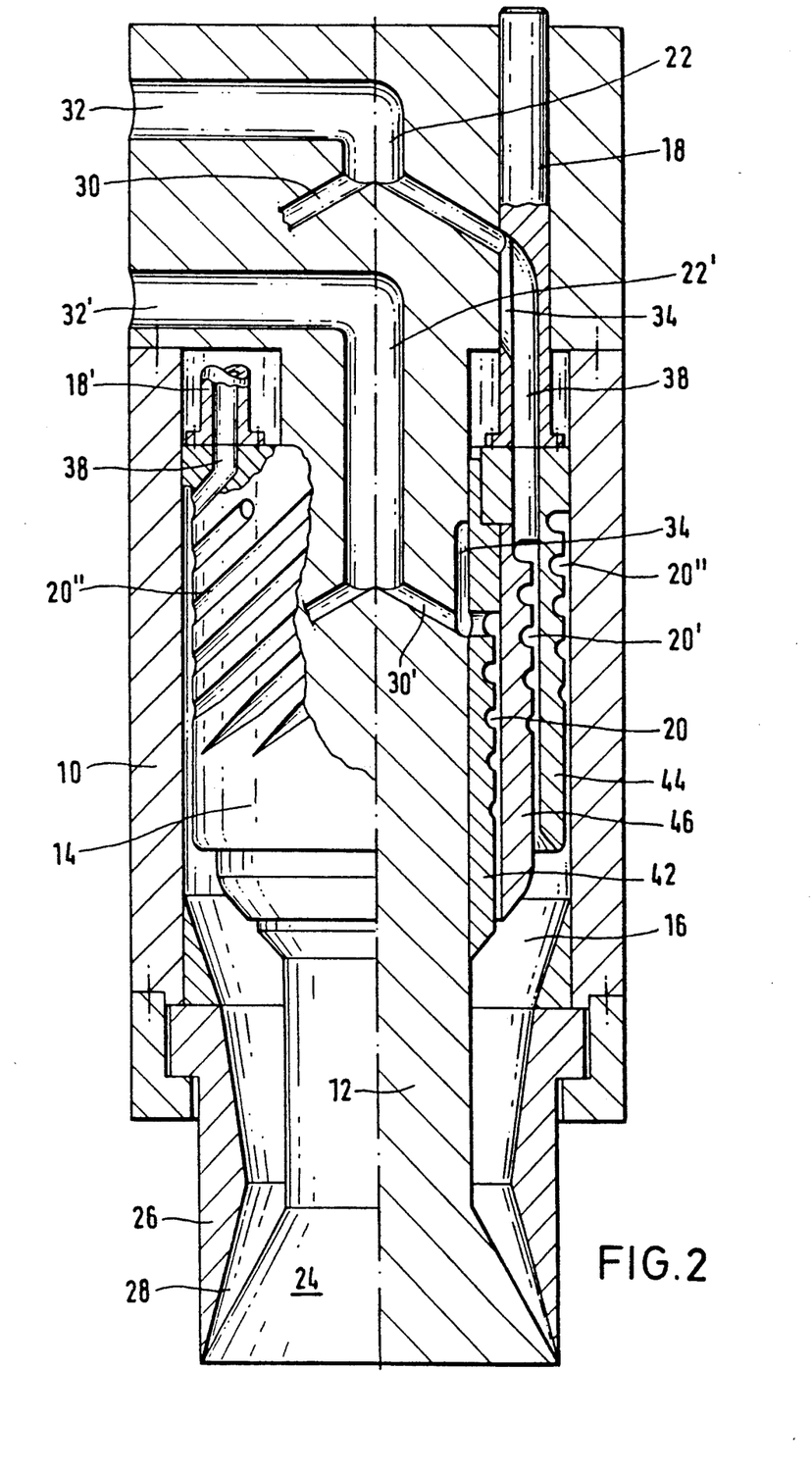
FIG. 2 shows a second inventive storage head to produce a triple-layer, co-extruded hollow body.

FIG. 2 shows as triple-layer co-extrusion head. The hollow setbolts 18 and 18' (through the longitudinal grooves 34) are respectively supplied with plastic from an extruder through the radial boring 32 and the then-following axial boring 22 in the shaft 12, and through the further following radial boring 30 (partial streams). However, following this, the spiral-channel distributor 20' on the middle tubular piece 46 is supplied with plastic melt through three hollow setbolts 18, while the spiral-channel distributor 20" on the outer tubular piece 44 is supplied through three other setbolts 18'. Through this inventive measure, too, a plastic material from an appropriately large extruder can be distributed uniformly on the circumference, simultaneously in two layers, much faster and better and with much higher throughput power.

The partial section on the left half of the drawing shows the spiral-channel distributor 20". To avoid shearing action, this spiral-channel distributor is suitably covered by a thin metal sheath that is not shown in the drawing. It is important for the structural design of the spiral-channel distributors that the individual spirals are disposed at a distance from one another. Here, the average distance has about the same axial width as the width of a spiral groove. It is also important that the width of the spiral grooves decreases slowly and steadily with increasing length, and that the cylindrical area lying in between correspondingly increases and becomes wider. Here, the spiral grooves are bounded laterally by defined edges. The lower edge or the downwardly adjoining cylindrical surface is, in each case, set back a little relative to the upper edge.

The spiral channels here have a semicircular cross-section, at least at their beginning. As the length of the spirals increases, this semicircular cross-section becomes flatter and flatter, and the depth of the spirals decreases more and more.

Figure 3:
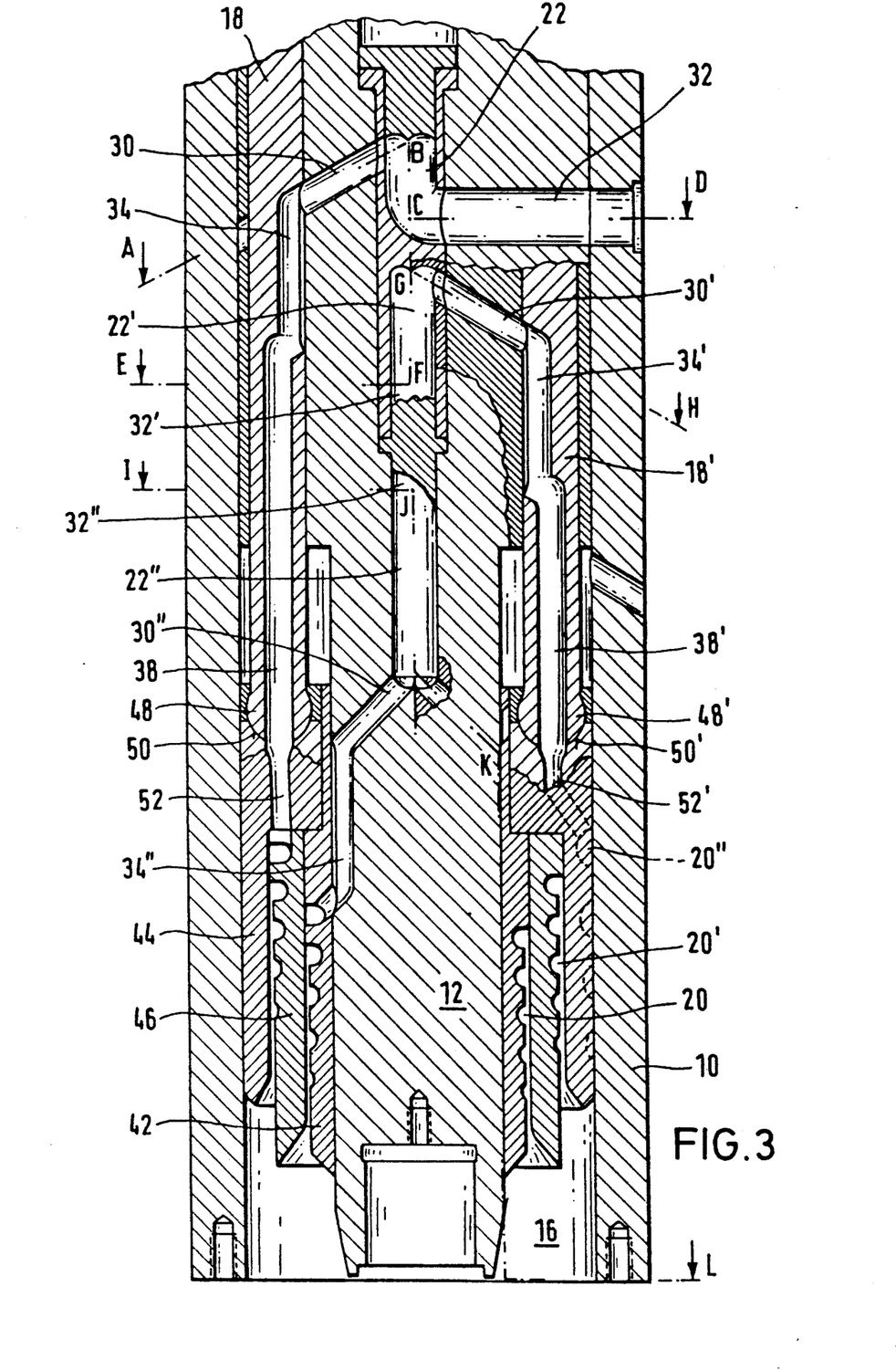
FIG. 3 shows a third inventive storage head and FIG. 4 is a cross-sectional view taken along lines A-B-C-D of FIG. 3.

The representation of FIG. 3 shows the central feeds and the distribution of the partial streams from three different plastic main streams to three spiral-channel distributors (triple-layer co-extrusion). Only in this way are the same rheological flow conditions created for all the plastic particles in the respective plastic streams. So that the structural height of such a storage head need not be made needlessly large, it may be suitable, at least in the case of one central boring 22, to dispose the feed of the plastic melt from the extruder via the radial borings 32 (main stream) into the end of boring 22 that faces the ejector piston 16 and to connect in the same direction as the lower end of the star-shaped radial borings 30, which lead to the spiral channels, at the other end of the boring 22 which faces in a direction away from the the lower end of the piston. In this way, the plastic melt in this central boring 22 is conducted in a flow direction opposite to the ejection direction.

This is done here in connection with the central boring 22', which is disposed in the middle. The radial borings 30', which follow said central boring, merge on top and allow the partial streams to flow through the hollow setbolts 18' to a spiral-channel distributor 20", which is disposed on the outside sheath 44 (for the sake of simplicity, only shown in phantom in the drawing). The partial streams here flow into the six individual spiral channels of the spiral-channel distributor 20". (The nozzle core 24, the nozzle ring part 26 with the intermediate annular gap nozzle 28 likewise are not shown here.) The partial streams from the infeed borings 38' of the three hollow setbolts 18' are again divided or forked the infeed lines 52' and thus can always feed two adjoining spirals.

As another inventive feature, FIG. 3 shows that the connection or juncture between the hollow setbolts 18 as plastic infeed line and as head area of the ejector piston is designed as a spherically shaped connecting element with a spherically shaped head 48 and a spherically shaped shell 50.

The lower end of the setbolt 18 is here suitably designed as a spherical head 48. On the other hand, the corresponding spherical shell 50 is formed above, in the head area of the ejector piston. Naturally, this junction in principle would also be possible in the inverse design. This serves very simply to compensate tolerances and thermal stresses between the long movable setbolts and the adjoining ejector piston as well as the outer fixed components of the housing. Since the setbolts 18 essentially sustain only pressure stresses, the spherical head 48 of the setbolts can be fastened on the ejector piston simply by means of annular pieces formed like hemispherical shells. With a multiple-layer co-extrusion head, the directions and courses of the spirals of the spiral channels can be designed differently for at least two adjoining distributor elements with spiral channels. In other words, they can be designed oppositely right-handed and left-handed.

In this way, one can achieve a crossing overlap of individual circumferential layers with a resulting increase of strength, e.g., against the interior pressure stresses from the blown hollow body.

Figure 4:
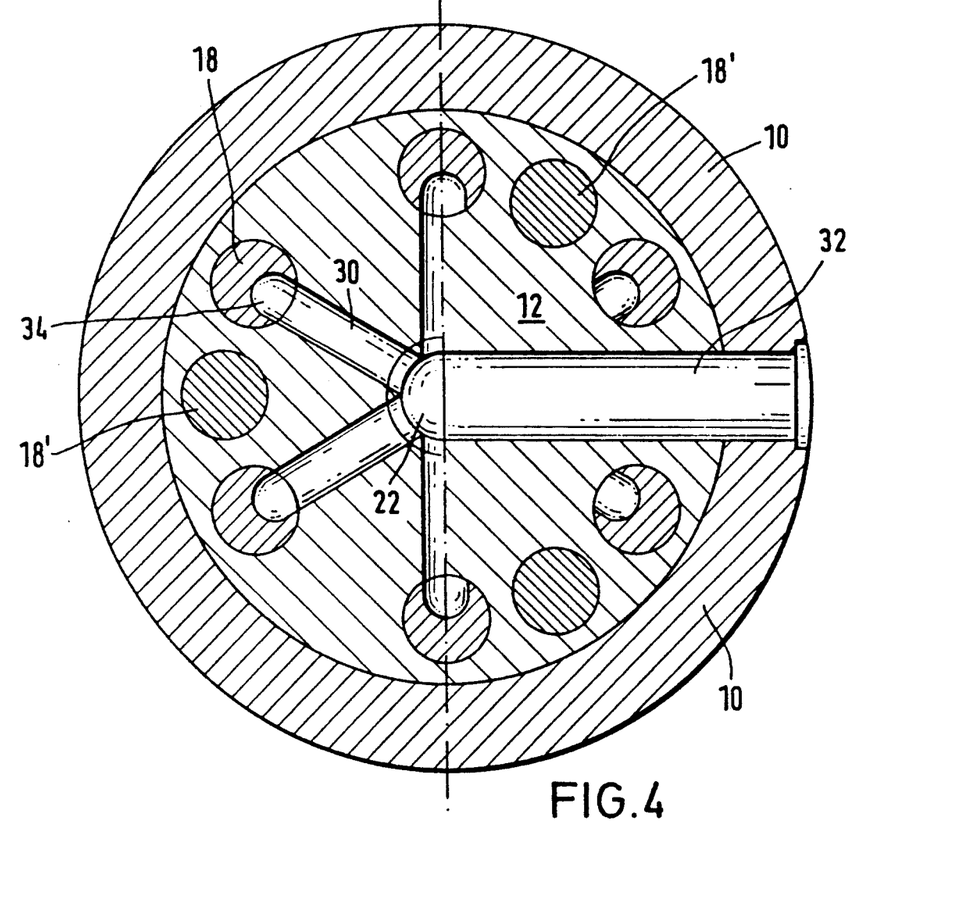

FIG. 4 shows a cross-section through the upper part of the storage head according to the exploded plane A-B-C-D in FIG. 3. The plastic melt conducted from the extruder passes through the radial infeed boring 32 into the axial boring 22 which is disposed centrally in the shaft 12. To equalize the pressure due to the deflection from the boring 32, the axial boring 22 should have about three times the length of its diameter. From the axial boring 22, the partial streams pass through the star-shaped radial boring 30 into the longitudinal grooves 34, which are laterally disposed in the six setbolts 18 (for stroke equalization). From there, they pass through the longitudinal borings 38 in the setbolts 18 to the individual spiral channels. Here the other setbolts 18', which are disposed symmetrically in between, are still designed solid.

Figure 5:
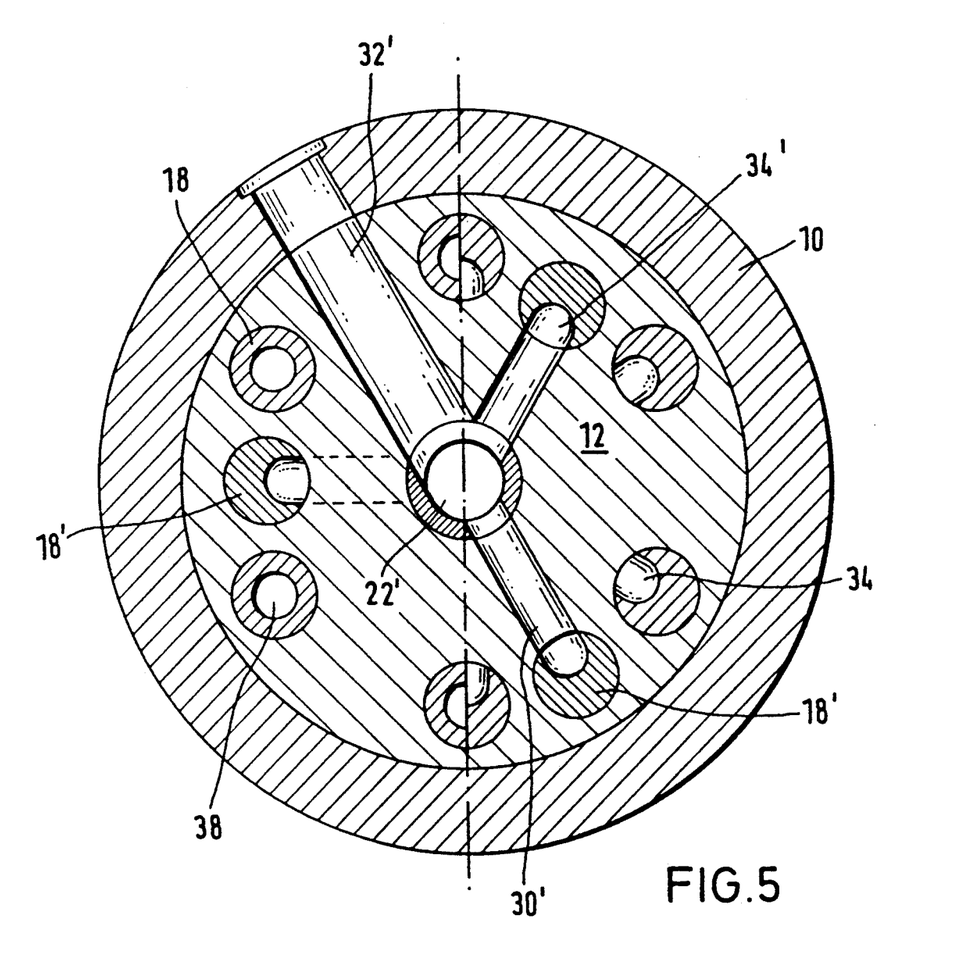
FIG. 5 is a cross-sectional view taken along lines E-F-G-H of FIG. 3.

The cross-section in FIG. 5 runs in the exploded plane E-F-G-H in FIG. 3. Here, the plastic stream passes through the radial infeed boring 32' from the extruder and into the axial boring 22'. It flows from the bottom to the top through the radial borings 30', which merge on top with the axial boring 22'. It continues via the longitudinal grooves 34', into the hollow setbolts 18'. The transition from the setbolt boring 38' to the feed line 52' in the ejector piston 14, as already explained, takes place through a spherical-head juncture 48', 50'. The three feed lines 52' are forked once again and go over into six spiral channels. The feed borings 38 in the setbolts 18 can be seen in the left half of FIG. 5, while the longitudinal grooves 34 are cut in the right half of the drawing.

Figure 6:
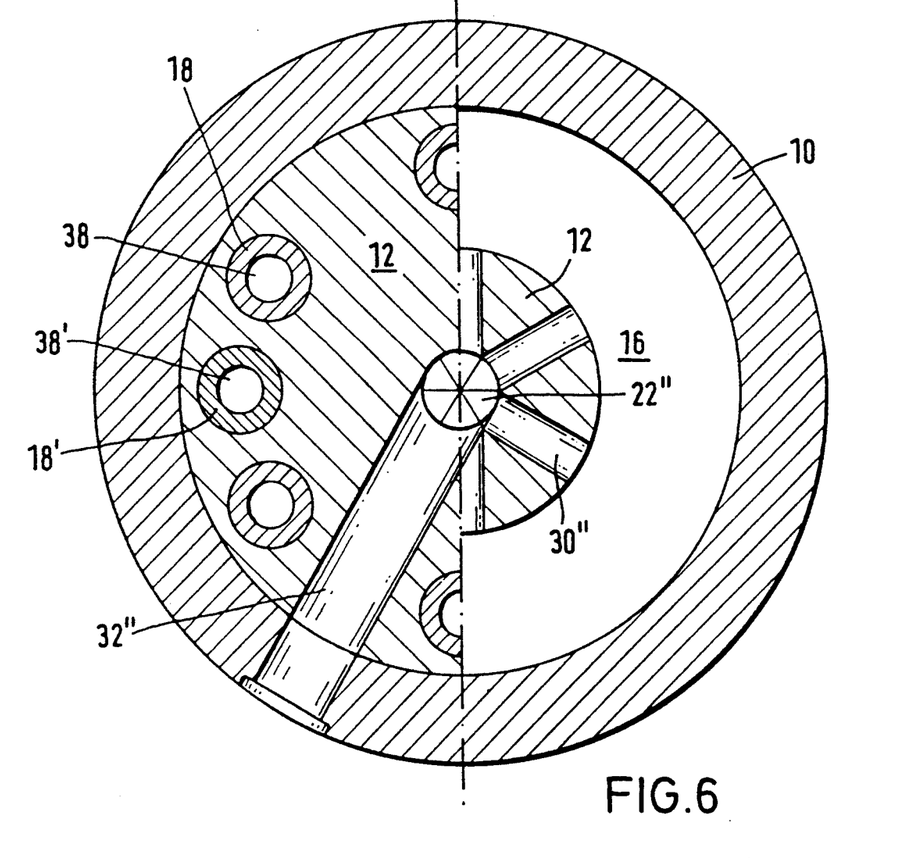
FIG. 6 is a cross-sectional view taken along lines I-J-K-L of FIGS. 3.

FIG. 6 shows the cut plane I-J-K-L from FIG. 3. The neighboring setbolts 18, 18' together with their feed borings 38, 38' can be seen in the left half of the drawing. The axial boring 22" is fed from a third extruder via the radial boring 32'. It distributes six partial streams over the smaller radial borings 30", via the longitudinal grooves 34" in the shaft 12, through the individual spiral grooves of the inner spiral-channel distributor 20.

The structural features shown in the various embodiments can be arbitrarily interchanged. With the inventive embodiments of a storage head housing with spiral-channel distributors, plastic hollow bodies can be produced with improved product quality while increasing the production speed.

LIST OF REFERENCE NUMBERS storage-head housing
shaft
ejector piston
storage space
setbolt
spiral-channel distributor
central feed (axial boring)
nozzle core
nozzle ring part
annular gap (nozzle)
radial borings
infeed extruder
longitudinal groove
intermediate sheath
borings (18)
inner tubular piece
outer tubular piece
middle tubular piece
spherical head (18)
spherical shell (14)
feed line (to 20)

We claim:

1. A storage head for a blow molding machine for the discontinuous production of multiple-layer high-volume plastic hollow bodies, comprising: at least two extruders connected to a storage-head housing (10) to feed at least two liquid plastic melts into an annular storage space of a storage head; a centrally disposed shaft (12); and at least two mutually independent distributor elements, concentrically surrounding the shaft (12) to distribute the plastic melts circumferentially of said shaft and to conduct them into said annular storage space (16) below an ejector piston (14), which is mounted in the storage-head housing (10) by means of one or more setbolts (18) so as to be movable axially, and by means of which a multiple-layer plastic melt which is distributed circumferentially of said shaft and which is stored in the storage space (16) is co-extruded through an annular nozzle gap (28) which is disposed below the storage space (16), wherein the ejector piston (14) consists of at least two tubular pieces (42, 44, 46) which surround one another concentrically, and a separate one of said distributor elements is located on each said tubular piece (42, 44, 46), each said distributor element being defined by a cylinder shaped spiral-channel distributor (20).

2. The storage head of claim 1, wherein the axial length of each spiral channel distributor is about the same in the longitudinal direction as its respective circular diameter, and wherein at least two spiral channel distributors are provided so as to be uniformly located along the circumference of the distributor element.

3. The storage head of claim 1, wherein the individual spiral channel distributors are disposed at a distance from one another which has about the same axial width as the width of one spiral channel distributor, and wherein the width of the spiral channel distributor decreases slowly but steadily with increasing length, and the cylindrical area lying in between increases correspondingly, and the spiral channel distributor being bounded laterally by defined upper and lower edges, and the lower edge and the downwardly adjoining cylindrical surface being set back relative to the upper edge.

4. The storage head of claim 1, wherein the spiral channels have a semicircular cross-section at least at their beginning, and said semicircular cross-section becomes flatter with increasing length, and the depth of the spirals decreases more.

5. The storage head of claim 1, further comprising essentially radial boring (32, 32') leading into the shaft (12) for receiving plastic melt from at least two extruders, said borings (32, 32') in said shaft (12) leading to, at least two axial borings (22, 22') situated centrally within the shaft (12), and the individual spiral channels to be supplied with plastic melt are connected to the central borings (22, 22') respectively through borings (30, 30') which run radially and which are disposed in star-shaped fashion.

6. The storage head of claim 5, wherein the length of the respective axial borings (22, 22') situated centrally in the shaft (12), is at least as long as the diameter of the boring (22, 22') itself.

7. The storage head of claim 5, wherein, for at least one axial boring (22, 22'), the radial boring (32, 32') is disposed on that side that is connected to the axial boring at an end thereof facing the lower end of the ejector piston (14), and the star-shaped radial borings (30, 30'), which lead to the spiral channels, are connected to the axial boring (22, 22') at the opposite end thereof which faces away from the lower end of the ejector piston (14), so that the plastic melt in said central axial boring (22, 22') is conducted in a flow direction that is opposite to the ejection direction.

8. The storage head of claim 1, wherein at least one of the setbolts (18), which connect on top to the ejector piston (14), is hollow for conducting the plastic melt into a distributor element (20).

9. The storage head of claim 8, wherein the connection between the hollow setbolt (18) to the ejector piston (14), is by way of a spherically shaped connection defining a spherical head (48) and a spherical shell (50).

10. The storage head of claim 1 wherein, at least two adjoining distributor elements include spiral channel distributors which are designed oppositely right-handed and left-handed.

11. The storage head of one of the preceding claims 1 through 10, wherein, to form a multiple-layer plastic body, a distributor element with spiral channel distributors is provided for each layer of plastic melt to be extruded, said channel distributors being connected to at least two extruders, and wherein the ejector piston (14) includes concentric cylindrical tubular pieces (42, 44, 46), and the spiral-channel distributor (20) is disposed between the individual cylindrical tubular pieces (42, 44, 46), the spirals of each spiral-channel distributor being formed in the outside wall of each tubular piece (42, 44, 46).

* * * * *